United States Patent [19]

Graser et al.

[11] 4,368,582

[45] Jan. 18, 1983

[54] PROCESS FOR DRYING FINELY DIVIDED PIGMENTS

[75] Inventors: Fritz Graser, Ludwigshafen; Gerhard Wickenhaeuser, Birkenheide, both of Fed. Rep. of Germany

[73] Assignee: BASF Aktiengesellschaft, Rheinland-Pfalz, Fed. Rep. of Germany

[21] Appl. No.: 242,189

[22] Filed: Mar. 10, 1981

[30] Foreign Application Priority Data

Mar. 13, 1980 [DE] Fed. Rep. of Germany ....... 3009603

[51] Int. Cl.³ .............................................. F26B 5/04
[52] U.S. Cl. ...................................................... 34/15
[58] Field of Search ..................... 34/15; 106/262, 309

[56] References Cited

U.S. PATENT DOCUMENTS 2,024,611 12/1935 Stutz et al. ......................... 34/15 X

FOREIGN PATENT DOCUMENTS

| | | |
|---|---|---|
| 1770960 | 8/1975 | Fed. Rep. of Germany . |
| 2115131 | 1/1976 | Fed. Rep. of Germany . |
| 2457687 | 6/1976 | Fed. Rep. of Germany . |
| 2013818 | 4/1978 | Fed. Rep. of Germany . |
| 2705107 | 8/1978 | Fed. Rep. of Germany . |
| 2727484 | 1/1979 | Fed. Rep. of Germany . |
| 2084915 | 12/1971 | France . |
| 1160987 | 8/1969 | United Kingdom . |

OTHER PUBLICATIONS

Handbook of Chemistry and Physics, Charles D. Hodgman, M.S. 39th ed., p. 2125.
Elements of Physical Chemistry, Samuel Glasstone and David Lewis, Liquefaction and the Properties of Liquids, pp. 118–119.

*Primary Examiner*—John J. Camby
*Attorney, Agent, or Firm*—Oblon, Fisher, Spivak, McClelland & Maier

[57] ABSTRACT

A process for drying finely divided pigments contained in a press cake or a suspension, wherein a mixture of the pigment and a liquid whose critical temperature is below the decomposition temperature of the pigment is heated under pressure to above the critical temperature of the liquid and is then released while keeping the temperature above the dew line of the liquid. The process gives fine pigments powders which are easily dispersible in the media in which pigments are used, and which produce deep, brilliant colorations.

14 Claims, No Drawings

PROCESS FOR DRYING FINELY DIVIDED PIGMENTS

The invention relates to a process for drying finely divided pigments which are in the form of press cakes containing liquids.

In the course of manufacture, or in the course of conversion to a tinctorially useful pigmentary form, pigments are as a rule obtained in the form of press cakes or filter residues which contain aqueous and/or organic solvents. On drying the filter residue, the fine pigment particles agglomerate, ie. drying adversely affects the pigmentary properties of the product. In many cases, the dried product is more difficult to disperse, since the agglomerates must be broken up again when the product is used. This entails great expense in respect of time, energy and equipment such as dispersers.

In order to eliminate or reduce the disadvantages resulting from drying, agents intended to prevent agglomeration on drying, or to permit easy redispersion by wetting of the agglomerates with the use medium, are added to the moist pigments awaiting drying. Since these coating agents are not compatible with all the media in which pigments are employed, such coated pigments are of only limited usefulness, ie. different applications demand pigments with different coatings.

One of the aims in the pigment sector is to develop pigmentary forms which are easily dispersible and universally useful.

It is an object of the present invention to provide a drying process by which universally useful and easily dispersible pigments are obtained from the press cake.

We have found that this object is achieved and that a finely divided pigment powder is obtained from a press cake containing a liquid, or from a suspension, if a mixture of a finely divided pigment and a liquid whose critical temperature is below the decomposition temperature of the pigment is heated under pressure to above the critical temperature of the liquid and is then released, whilst keeping the temperature at all times above the dew line of the liquid.

The process according to the invention gives fine pigment powders which are easily dispersible in surface-coating compositions, printing inks and plastics and which give deep, brilliant colorations.

The process according to the invention is in general carried out by heating the mixture of finely divided pigment and liquid under a pressure which is above 80% of the critical pressure, and is preferably equal to or greater than the critical pressure, to a temperature above the critical temperature of the liquid employed. The pressure in the vessel is then released under isothermal conditions, whereupon the liquid escapes as gas and the pigment powder remains in the pressure vessel. However, an alternative procedure is to force the mixture out of the vessel with nitrogen and release it through a valve. If the mixture is below the critical pressure and at below the critical temperature, it must, before release, be brought to not less than 80% of the critical pressure, preferably to the critical pressure or above, and be heated to a supercritical temperature under isobaric conditions, for example in a flow-through heater. In this way, the heat exposure of the pigment is particularly brief and gentle. In both of these cases, the temperature, in the vessel or in the flow-through heater, must be sufficiently high that on releasing the pressure the two-phase region (dew line) is not reached. The liquid escapes as gas. If the mixture is released through a valve, the liquid escapes as gas together with the pigment powder, and the latter is separated off by means of a filter.

Suitable pigments are all colorants which are sparingly soluble or insoluble in organic solvents and in water, and which can be used to color surface-coating compositions, printing inks and/or plastics.

Preferred pigments are organic pigments, for example those derived from phthalocyanine, from quinacridone, from anthraquinone, from perylene-3,4,9,10-tetracarboxylic acid, from perylene-3,4,9,10-tetracarboxylic acid diimide, from quinophthalone, from indanthrone, from violanthrone, from flavanthrone, from pyranthrone, from indigo and from thioindigo, as well as pigments of the oxazine, isoindolenine and azo series.

Suitable liquids are compounds which are liquid under atmospheric or superatmospheric pressure and whose critical temperature is below the decomposition temperature of the pigment which is to be dried. For the purposes of the present invention, the decomposition temperature of the pigment is that at which the pigmentary form to be dried suffers damage.

Where the pigment is in the form of a suspension or of a press cake containing an unsuitable or relatively unsuitable liquid (=first liquid), whose critical temperature is above or near the maximum temperature which the pigment can withstand without damage, this liquid can be replaced by another, more suitable liquid, ie. by a liquid having a lower critical temperature. For this purpose, the pigment suspension or press cake can be mixed with the more suitable liquid (=second liquid) and the pigment separated off and washed with the second liquid. If the first and second liquids are immiscible with one another or if there is a miscibility gap, a further possibility is to remove the unsuitable liquid, after mixing with the second liquid, by phase separation. If necessary, this process is repeated until the first liquid has been completely replaced. As a rule, the liquid is replaced under a pressure equal to the vapor pressure of the second liquid. Alternatively, the second liquid may be in the supercritical state when used to displace the unsuitable or relatively unsuitable liquid. This procedure can be carried out in, for example, a suitable flow-through apparatus.

Examples of suitable liquids for the process according to the invention are $C_1$–$C_6$-alkanes, $C_2$–$C_6$-alkenes, $C_3$–$C_6$-cycloalkanes, halo-$C_1$–$C_3$-alkanes, where halogen is preferably chlorine and/or fluorine, eg. chloro- and fluoro-$C_1$–$C_3$-alkanes and chloro-fluoro-$C_1$- and -$C_2$-alkanes, halo-$C_2$-alkenes, where halogen is preferably chlorine and/or fluorine, eg. chloroethylene, fluoroethylene and chlorofluoroethylene, aliphatic $C_2$–$C_5$-ethers, $C_1$–$C_4$-alkyl formates, $C_1$- and $C_2$-alkyl acetates, $C_3$- and $C_4$-ketones, $C_1$–$C_3$-alkanols, mono-$C_1$–$C_4$-alkylamines, di- and tri-$C_1$- and -$C_2$-alkylamines, ammonia, $CO_2$ and $SO_2$.

Specific examples, in addition to those already mentioned, are:

(1) Amongst $C_1$–$C_6$-alkanes and $C_1$–$C_6$-alkenes, haloalkanes, haloalkenes and $C_3$–$C_6$-cycloalkanes: methane, ethane, propane, butane, isobutane, pentane, hexane, ethylene, propylene, butylene, pentene, methyl chloride, ethyl chloride, propyl chloride, methylene chloride, dichloroethane, methyl fluoride, tetrafluoromethane, dichlorodifluoromethane, dichlorofluoromethane, trichloroethylene, trifluorochloroethylene, trichlorofluoromethane, chlorodifluoromethane, chlorotrifluoromethane, cyclobutane, cyclopentane and cyclohexane.

(2) Amongst low molecular weight ethers, esters, ketones and alcohols: dimethyl ether, diethyl ether, methyl propyl ether, ethyl propyl ether, methyl formate, ethyl formate, propyl formate, butyl formate, methyl acetate, ethyl acetate, acetone, methyl ethyl ketone, methanol, ethanol and isopropanol.

(3) Amongst alkylamines: methylamine, ethylamine, propylamine, butylamine, isobutylamine, dimethylamine, trimethylamine, diethylamine and triethylamine.

Amongst the said liquids, the $C_3$–$C_5$-alkanes, methyl chloride, ethyl chloride, ammonia, methylamine, ethylamine, dimethylamine, trimethylamine and $CO_2$ are preferred.

In the process according to the invention it is important, in selecting the liquids to be used, to ensure that the critical temperature of the liquid is below, preferably substantially below, ie. about 50° C. below, the decomposition point or dulling point of the pigment. Further, it must be borne in mind that certain pigments can react with some liquids; for example, amino-containing pigments can react with alkyl halides or esters, and pigments containing complex metals or activated halogen atoms can react with ammonia or amines. In such cases, liquids which are inert under the process conditions must be used.

The process according to the present invention can also be combined with recrystallizing the pigment, by using liquids whose critical temperature and chemical behavior conform to the above conditions, and in which crystallization of the fine pigment particles takes place. Such recrystallization or conditioning can be carried out under conventional conditions, ie. substantially below the critical temperature of the liquid, or with the liquid in the critical or supercritical state. The pigments are worked up and isolated in the above manner, in which the pigment is obtained in a dried form. Suitable liquids for this method are $C_2$–$C_5$-alkanes, $C_5$- and $C_6$-cycloalkanes, $C_3$–$C_5$-alkenes, $C_1$–$C_3$-haloalkanes, $C_2$-haloalkenes, $C_2$–$C_5$-ethers, $C_1$–$C_4$-alkyl formates, $C_1$- and $C_2$-alkyl acetates, $C_3$- and $C_4$-ketones, $C_1$–$C_3$-alkanols, $C_1$–$C_4$-primary alkylamines, di- and tri-$C_1$- and -$C_2$-alkylamines and ammonia. Particularly suitable liquids are $C_3$–$C_5$-alkanes, eg. propane, butane, pentane, isobutane and isopentane, $C_1$- and $C_2$-haloalkanes, eg. methyl chloride, ethyl chloride, methyl fluoride and difluorodichloromethane, methylamine, ethylamine, dimethylamine, trimethylamine, triethylamine, ammonia and dimethyl ether.

The Examples which follow illustrate the process. Parts and percentages are by weight. Parts by volume bear the same relation to parts by weight as that of the milliliter to the gram.

EXAMPLE 1

112 parts (calculated as solids) of hexadecachloro-copper phthalocyanine in pigmentary form (obtained as described in Example 1 of German Pat. No. 2,013,818) in the form of a 35% strength paste in xylene are washed with 3,500 parts of carbon dioxide in a stirred pressure vessel, of capacity 1,000 parts by volume, at 40° C. and under a pressure of 80 bar, until all the xylene has been displaced. The suspension is then heated to 60° C., the pressure being limited to 120 bar, and thereafter the pressure is released whilst keeping the temperature constant at 60° C. The pigment is left in a dried state in the pressure vessel. A hexadecachloro-copper phthalocyanine pigment which is very easily dispersible and gives deep colorations is obtained in quantitative yield.

The xylene/carbon dioxide mixture obtained on washing is heated to 80° C. under 80 bar, which causes it to separate into 2 phases. The xylene-containing phase is separated off by means of a phase separator and is discharged from the system. The carbon dioxide phase can be re-used to wash the xylene-containing pigment.

If the above procedure is followed but the xylene-containing paste (pigment content 43%) is washed with 1,500 parts of carbon dioxide at 60° C. and 120 bar instead of 40° C. and 80 bar, a pigment with entirely similar properties is obtained.

EXAMPLE 2

168 parts (calculated as solids) of N,N-dimethylperylene-3,4,9,10-tetracarboxylic acid diimide pigment, in the form of an aqueous filter cake (containing 28% of pigment), which has been prepared by methylating perylene-3,4,9,10-tetracarboxylic acid diimide with methyl chloride in an aqueous alkaline medium by the method of German Laid-Open Application DOS No. 2,727,484, Example 1a, is washed with 760 parts of liquid ammonia at 8 bar and 20° C. in a high pressure tube, of 700 parts by volume capacity, fitted with a steel frit. When the water has been completely displaced by the ammonia, the mixture is briefly heated to 140° C. in a flow-through heater at a constant pressure of 120 bar, set up by means of nitrogen, and is then released through a throttle valve. A filter is used to separate the pigment from the gaseous ammonia, and isolate it. The dried pigment obtained is uncoated and very easily dispersible in surface-coating compositions.

EXAMPLE 3

(a) 39 parts of perylene-3,4,9,10-tetracarboxylic acid diimide in the form of a mill base obtained as described in the last paragraph of this Example, are stirred with 400 parts of ammonia for 4 hours at 60° C. under a pressure of 55 bar in a pressure vessel of capacity 1,000 parts by volume. The pressure is then raised to 140 bar by forcing nitrogen into the vessel, and the suspension is briefly heated to 160° C. under a constant pressure of 140 bar, in a flow-through heater, and then immediately released through a throttle valve. A filter is used to separate the pigment from the gaseous ammonia, and isolate it. A pigment in the form of a fine crystalline powder is obtained.

(b) The perylene-3,4,9,10-tetracarboxylic acid diimide used as the starting material was obtained by milling the crude product in a vibratory mill in the absence of assistants, for 24 hours. The mill base consists of 2–150 $\mu$m agglomerates, made up of primary particles of $\leq 0.2$ $\mu$m.

EXAMPLE 4

(a) 70 parts of finely milled copper phthalocyanine, obtained as described under (b), are mixed with 335 parts of propane for 4 hours at 100° C. and 70 bar in a stirred pressure vessel of capacity 1,000 parts by volume. The mixture is briefly heated to 135° C. in a flow-through heater under a constant pressure of 70 bar, set up by means of nitrogen, and is then immediately released through a throttle valve. A filter is used to separate the copper phthalocyanine from the gaseous propane, and isolate it.

A very finely divided copper phthalocyanine pigment in the β-modification is obtained in quantitative yield; the pigment gives deep colorations in brilliant hues, and is easily dispersible in surface-coating compositions and printing inks.

(b) Crude copper phthalocyanine was milled for 30 hours in a ball mill in the absence of assistants. The mill base consists of 2–200 μm agglomerates made up of primary particles of ≦0.1 μm.

EXAMPLE 5

79 parts (calculated as solids) of indanthrone pigment in the form of the aqueous 24.4% strength press cake obtained as described in Example 1 of German Laid-Open Application DOS No. 2,705,107 are washed, at 10 bar and 8° C., with 1,900 parts of liquid ammonia in a high pressure tube fitted with a steel frit, until the water has been completely displaced by ammonia. The ammonia suspension is then heated to 140° C., the pressure being limited to 120 bar, and is subsequently released at constant temperature. A quantitative yield of an indanthrone pigment which is easily dispersible, particularly in surface-coating compositions, remains in the pressure vessel.

EXAMPLE 6

435 parts (calculated as solids) of copper phthalocyanine pigment, in the β-modification, which has been converted to the pigmentary form in isobutanol and is in the form of a 63% strength press cake moist with isobutanol, are washed with 2,000 parts of carbon dioxide at 60° C. and 120 bar in a stirred pressure vessel. When the isobutanol has been displaced, the mixture, at 60° C. and under a constant pressure of 120 bar, is released by forcing it through a throttle valve. The dried pigment is separated off, and isolated, by means of a filter.

A pigment which has high tinctorial strength and is very easily dispersible is isolated in quantitative yield.

EXAMPLE 7

47.4 parts (calculated as solids) of the azo pigment which is obtained from 2-(3-phenyl-1,2,4-oxdiazolyl)-aniline and 2,6-dihydroxy-3-cyano-4-methylpyridine by the method of Example 1 of German Published Application DAS No. 2,457,687, and which is in the form of a 15.8% strength aqueous paste, are washed water-free with isobutanol on a suction filter under atmospheric pressure. The filter cake, moist with isobutanol, is then washed free from isobutanol with 3,000 parts of liquid carbon dioxide at 8° C. and 60 bar pressure in a high pressure tube fitted with a steel frit. The suspension in carbon dioxide is heated to 60° C., the pressure being restricted to 120 bar. The mixture is then released, at a constant temperature of 60° C., through a throttle valve. A soft-textured pigment, which is very easily dispersible in a gasoline-based gravure printing ink, is obtained in quantitative yield.

EXAMPLE 8

104 parts (calculated as solids) of N,N-dimethylperylene-3,4,9,10-tetracarboxylic acid diimide pigment, which is in the form of an aqueous filter cake (containing 28% of pigment) prepared by methylating perylene-3,4,9,10-tetracarboxylic acid diimide with methyl chloride in an aqueous alkaline medium as described in Example 1a of German Laid-Open Application DOS No. 2,727,484, is washed water-free with isobutanol on a suction filter. The filter cake, moist with isobutanol, is washed free from the latter with 3,000 parts of liquid carbon dioxide at 7° C. and 60 bar in a high pressure tube of capacity 700 parts by volume, fitted with a steel frit. The suspension in carbon dioxide is then treated as described in Example 7. A pure uncoated pigment, possessing dispersibility similar to that of the pigment of Example 2, is obtained in quantitative yield.

EXAMPLE 9

190 parts (calculated as solids) of copper phthalocyanine pigment in the β-modification, which has been converted to the pigmentary form in an isobutanol/water mixture and is in the form of a 63% strength press cake moist with isobutanol, are washed with 4,000 parts of liquid ammonia at 8°–10° C. and 10–12 bar in a high pressure tube fitted with a steel frit, until the isobutanol and the residual water contained therein have been completely displaced by ammonia. The pigment/ammonia mixture is then heated to 140° C., the pressure being limited to 120 bar. The mixture is then released at constant temperature. A quantitative yield of a copper phthalocyanine pigment, which has high tinctorial strength and is very easily dispersible, remains in the pressure vessel.

EXAMPLE 10

The procedure described in Example 9 is followed, but, instead of 190 parts, 128 parts (calculated as solids) of copper phthalocyanine are used, and are washed with 1,800 parts of ammonia at 60° C. and 120 bar instead of 8°–10° C. and 10–12 bar. A quantitative yield of a copper phthalocyanine pigment, which has high tinctorial strength, is very easily dispersible, and virtually corresponds, in its properties, to the pigment produced according to Example 9, is obtained.

EXAMPLE 11

132 parts (calculated as solids) of hexadecachloro-copper phthalocyanine in the pigmentary form, which has been obtained as described in Example 1 of German Pat. No. 2,013,818 and is in the form of a thoroughly suction-drained paste in xylene, containing 46.3% of pigment, are washed with 2,800 parts of liquid carbon dioxide at 10° C. and 60 bar in a high pressure tube, having a capacity of about 700 parts by volume and fitted with a steel frit, until all the xylene has been displaced. The suspension is then heated to 60° C., the pressure being restricted to 120 bar, and thereafter the mixture is released at a constant temperature of 60° C. The pigment, in the dried state, remains in the pressure tube. A quantitative yield of a hexadecachloro-copper phthalocyanine pigment, which is very easily dispersible and gives deep colorations, is obtained.

The xylene/carbon dioxide mixture which arises is worked up as described in Example 1, paragraph 3.

EXAMPLE 12

70 parts of finely milled copper phthalocyanine (prepared as described in Example 4b) are mixed with 420 parts of liquid ammonia under about 12 bar, at ambient temperature, in a stirred pressure vessel of capacity 1,200 parts by volume. The mixture is then heated to 120° C. in the course of about 15 minutes and is stirred for 4 hours at 100 bar. Thereafter it is forced, by means of nitrogen at 100 bar, through a flow-through heater, which briefly heats it to 140° C. under constant pressure, and is then immediately released through a throttle valve. A filter is used to separate the copper phthalocyanine from the gaseous ammonia, and isolate it.

A very finely divided copper phthalocyanine pigment, which gives brilliant deep colorations and is easily dispersible in surface-coating compositions, is obtained in very good yield.

EXAMPLE 13

70 parts of finely milled copper phthalocyanine (prepared as described in Example 4b) are mixed with 420 parts of liquid methyl chloride at about 9 bar and 20° C. in a stirred pressure vessel of capacity 1,200 parts by volume and the mixture is then heated to 150°–155° C. in the course of about 15 minutes, resulting in a pressure of 78 bar, and is stirred for 30 minutes at this temperature. Thereafter the mixture is forced through a throttle valve by means of nitrogen, and is thereby released. A filter is used to separate the copper phthalocyanine from the gaseous methyl chloride, and isolate it. A very finely divided copper phthalocyanine pigment is obtained in excellent yield; the pigment gives deep brilliant colorations and is easily dispersible in surface-coating compositions, printing inks and plastics.

The methyl chloride can be re-used after liquefaction.

EXAMPLE 14

70 parts of finely milled copper phthalocyanine (obtained as described in Example 4b) are mixed with 420 parts of liquid ethyl chloride at about 5 bar and 20° C. in a stirred pressure vessel of capacity 1,200 parts by volume, and the mixture is then heated to 100° C. in the course of about 10 minutes, resulting in a pressure of 12 bar, and is stirred at this temperature for 15 minutes. The pressure is then brought to 70 bar with nitrogen and the mixture is forced, under a constant pressure of 70 bar, through a flow-through heater, in which it is briefly heated to 220° C., and is then released through a throttle valve. A filter is used to separate the copper phthalocyanine from the gaseous ethyl chloride, and isolate it. An excellent yield of a very finely divided copper phthalocyanine pigment, which gives deep brilliant colorations and is very easily dispersible, is obtained.

The ethyl chloride can be re-used after liquefaction.

EXAMPLE 15

70 parts of finely milled copper phthalocyanine (obtained as described in Example 4b) are mixed with 420 parts of liquid propane at about 18 bar and 20° C. in a stirred pressure vessel of capacity 1,200 parts by volume, and the mixture is then heated to 135° C. in the course of about 15 minutes, resulting in a pressure of 105 bar, and is stirred at this temperature for 30 minutes. Using nitrogen, the mixture is then forced, at 105 bar and 135° C., through a throttle valve, and is thereby released. A filter is used to separate the copper phthalocyanine from the gaseous propane, and isolate it.

An excellent yield of a very finely divided copper phthalocyanine pigment, which gives deep brilliant colorations and is very easily dispersible, is obtained.

EXAMPLE 16

132 parts of hexadecachloro-copper phthalocyanine in the pigmentary form, which has been obtained as described in Example 1 of German Pat. No. 2,013,818 and is in the form of a thoroughly suction-drained paste in xylene, containing 46.3% of pigment, are washed with 3,000 parts of ethane at 10° C. and 50 bar in a high pressure tube, having a capacity of about 700 parts by volume and fitted with a steel frit, until all the xylene has been removed. The ethane/pigment mixture is then heated to 50° C., the pressure being restricted to 60 bar, and is released at a constant temperature of 50° C. The pigment, in the dried state, remains in the pressure tube. A quantitative yield of a hexadecachloro-copper phthalocyanine pigment, which is very easily dispersible and gives deep colorations, is obtained.

EXAMPLE 17

If the procedure described in Example 13 is followed but, instead of 70 parts, 140 parts of finely milled copper phthalocyanine are used, an excellent yield of a copper phthalocyanine pigment, which gives pure deep colorations and is very easily dispersible, is again obtained.

EXAMPLE 18

70 parts of perylene-3,4,9,10-tetracarboxylic acid bis-(4-phenyl-azo-anilide) (prepared as described in Example 1a of German Pat. No. 1,257,096; the crude product was redissolved in concentrated sulfuric acid and re-precipitated, and the precipitate was filtered off, washed neutral and dried) are mixed with 420 parts of ethyl chloride at 20° C. and 5 bar in a stirred pressure vessel of capacity 1,200 parts by volume, and the mixture is heated to 180° C. in the course of 30 minutes, during which a pressure of about 52 bar is set up, and is kept at this temperature for 4 hours. The mixture is then brought to a pressure of 70 bar with nitrogen and is forced, under constant pressure, through a flow-through heater, in which it is briefly heated to 200° C., after which it is slowly released via a throttle valve. A very finely divided perylene pigment is obtained in very good yield; the product gives deep red, very high-hiding baked finishes, and has excellent dispersibility.

EXAMPLE 19

(a) The procedure described in Example 18 is followed, but instead of perylenetetracarboxylic acid bis-phenylazoanilide, 70 parts of finely milled pyranthrone (prepared as described in (b)) are used. A very good yield of a finely divided, easily dispersible pyranthrone pigment, which gives deep, pure, reddish yellow baked finishes, is obtained.

(b) Crude pyranthrone, prepared as described in German Auslegeschrift DAS No. 2,115,131, Example 28, is milled for 8 hours in a planetary ball mill in the absence of assistants. The mill base consists of 1–100 μm agglomerates, made up of primary particles of ≦0.2 μm.

EXAMPLE 20

(a) The procedure in Example 18 is followed, but instead of perylenetetracarboxylic acid bis-phenylazoanilide, 70 parts of finely milled quinophthalone (prepared as described in (b)) are used. A very good yield of a finely divided, very easily dispersible quinophthalone pigment, which gives deep, pure, greenish yellow high-hiding baked finishes, is obtained.

(b) Crude 8-(tetrachlorophthalimido)-tetrachloroquinophthalone, prepared as described in German Published Application DAS No. 1,770,960, Example 1, is milled for 30 hours in a ball mill without added assistants. A mill base consisting of 1–20 μm agglomerates made up of primary particles of ≦0.1 μm is obtained.

EXAMPLE 21

In a pressure vessel of capacity 1,200 parts by volume, 70 parts of finely milled quinophthalone, prepared as described in Example 20b), are stirred with 420 parts of n-pentane at 20° C., and the mixture is heated, whilst stirring, to 180°–185° C. in the course of 30 minutes, resulting in a pressure of about 30 bar, and is kept at this temperature for 4 hours. The mixture is then brought to a pressure of 40 bar with nitrogen and is forced, under constant pressure, through a flow-through heater, where it is briefly heated to 210° C., after which it is slowly released through a throttle valve. A very good yield of a finely divided, very easily dispersible quinophthalone pigment, which gives deep, pure, greenish yellow high-hiding baked finishes, is obtained.

EXAMPLE 22

125 parts of copper phthalocyanine pigment in the $\beta$-modification (the pigment was obtained by recrystallizing the finely divided crude pigment in an isobutanol/water mixture) in the form of a moist press cake containing 63% of pigment, are washed with 2,000 parts of liquid trimethylamine at 20°–25° C. and a pressure of 55–60 bar in a high pressure tube of capacity 700 parts by volume, provided with a steel frit, until the isobutanol and the residual water present have been completely displaced. The mixture is then heated to 170° C. in the course of about 1.5 hours, the pressure being restricted to 60 bar, and is thereafter released at a constant temperature of 170°–172° C. A quantitative yield of a copper phthalocyanine pigment which has a high tinctorial strength and is very easily dispersible remains in the pressure tube.

We claim:

1. In a process for drying a finely divided pigment which is in the form of a press cake containing a liquid, or in the form of a suspension, by evaporating the liquid, the improvement comprising:
   (a) heating under pressure a mixture of a finely divided pigment and a liquid for drying said pigment whose critical temperature is below the decomposition temperature of the pigment to above the critical temperature of the drying liquid; and
   (b) releasing said pressure, while maintaining the temperature at all times above the due point of the liquid.

2. The process of claim 1, wherein said drying liquid is selected from the group consisting of $C_1$–$C_6$-alkanes, $C_2$–$C_6$ alkenes, $C_3$–$C_6$ cycloalkanes, halo-$C_1$–$C_3$-alkanes, halo-$C_2$-alkenes, wherein said halogen is fluorine, chlorine or mixtures thereof, aliphatic $C_2$–$C_5$-ethers, $C_1$–$C_4$-alkyl formates, $C_1$- and $C_2$-alkyl acetates, $C_3$- and $C_4$-ketones, $C_1$–$C_3$-alkanols, mono-$C_1$–$C_4$-alkylamines, di-$C_1$- and $C_2$-alkylamines, tri-$C_1$- and $C_2$-alkylamines, ammonia, carbon dioxide and sulfur dioxide.

3. The process of claim 1, wherein said drying liquid is selected from the group consisting of $C_3$–$C_5$-alkanes, methyl chloride, ethyl chloride, ammonia, methylamine, ethylamine, dimethylamine, trimethylamine and carbon dioxide.

4. The process of claim 1 or 2, wherein said pressure is above 80% of critical pressure of said drying liquid.

5. The process of claim 1 or 2, wherein said pressure is equal to or greater than the critical pressure of said drying liquid.

6. The process of claim 2, wherein the finely divided crude pigment is recrystallized in said drying liquid under a pressure which is below, equal to or above the critical temperature of said liquid; the mixture is heated under pressure to above the critical temperature of said drying liquid; and thereafter the pressure is released.

7. The process of claim 6, wherein said drying liquid is selected from the group consisting of $C_3$–$C_5$ alkanes, halo-$C_1$- and $C_2$-alkanes, wherein said halogen is chlorine, fluorine or mixture thereof, methylamine, ethylamine, dimethylamine, trimethylamine, triethylamine and ammonia.

8. The process of claim 6, wherein the mixture of the finely divided pigment in said drying liquid is heated under a pressure which is greater than 80% of the critical pressure of said drying liquid.

9. The process of claim 6, wherein said recrystallized, finely divided pigment and drying liquid is heated under a pressure which is equal to or above the critical pressure of said drying liquid.

10. In a process for drying finely divided pigments which are in the form of a press cake containing a liquid or in the form of a suspension, by evaporating the liquid, the improvement comprising:
    (a) displacing the liquid present in the press cake with a second liquid whose critical temperature is below the decomposition point of said pigment;
    (b) heating the mixture of the finely divided pigment and said second liquid under pressure to a temperature above the critical temperature of said second liquid; and
    (c) releasing said pressure, while maintaining the temperature at all times above the due line of the second liquid.

11. The process of claim 10, wherein said second liquid is selected from the group consisting of $C_1$–$C_6$-alkanes, $C_2$–$C_6$-alkenes, $C_3$–$C_6$-cycloalkanes, halo-$C_1$–$C_3$-alkanes, halo-$C_2$-alkenes, wherein said halogen is fluorine, chlorine or mixtures thereof, aliphatic $C_2$–$C_5$-ethers, $C_1$–$C_4$-alkyl formates, $C_1$- and $C_2$-alkyl acetates, $C_3$- and $C_4$-ketones, $C_1$–$C_3$-alkanols, mono-$C_1$–$C_4$-alkylamines, di-$C_1$- and $C_2$-alkylamines, tri-$C_1$- and $C_2$-alkylamines, ammonia, carbon dioxide and sulfur dioxide.

12. The process of claim 10, wherein said second liquid is selected from the group consisting of $C_3$–$C_5$-alkanes, methyl chloride, ethyl chloride, ammonia, methylamine, ethylamine, dimethylamine, trimethylamine and carbon dioxide.

13. The process of claim 10, wherein said mixture of the finely divided pigment in said second liquid is heated under a pressure which is above 80% of the critical pressure of said second liquid.

14. The process of claim 10, wherein said mixture of the finely divided pigment in said second liquid is heated under a pressure which is equal to or greater than the critical pressure of said second liquid.

* * * * *